United States Patent
Johnson

(10) Patent No.: US 6,628,464 B1
(45) Date of Patent: *Sep. 30, 2003

(54) SLOTTED PEEP

(75) Inventor: Kenneth E. Johnson, Bloomington, MN (US)

(73) Assignee: Kenneth Edward Johnson, Bloomington, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 70 days.

(21) Appl. No.: 08/856,204

(22) Filed: May 14, 1997

(51) Int. Cl.[7] ............................. G02B 27/00; F41G 1/00
(52) U.S. Cl. ......................... 359/894; 359/428; 42/130; 42/111; 124/87
(58) Field of Search ................................ 359/428, 894, 359/895; 33/233; 42/111, 130, 131; 124/87, 90

(56) References Cited

U.S. PATENT DOCUMENTS

| | | | | |
|---|---|---|---|---|
| 2,339,723 A | * | 1/1944 | Russell | 42/130 |
| 3,861,050 A | * | 1/1975 | Mauro | 33/233 |
| 4,362,364 A | * | 12/1982 | Smith | 359/305 |
| 5,080,084 A | * | 1/1992 | Kendall et al. | 124/87 |

\* cited by examiner

Primary Examiner—Audrey Chang
(74) Attorney, Agent, or Firm—Kenneth Edward Johnson

(57) ABSTRACT

The slotted peep of this invention is a device that eliminates the detrimental effects of diffracted light from its aperture. Diffraction causes light to bend toward and perpendicular to an object's edge. In a current peep's aperture diffracted light is neither controlled nor eliminated. Diffracted light creates several shortcomings in current peeps which impair their accuracy and utility. The current aperture must be oversized to allow space for the diffracted light. The visual size and shape of the current aperture will vary with changes in the light diffraction. Under low light conditions, enough light may be diffracted within the current peep aperture that a user may not be able to see through the peep. A slotted peep is designed to eliminate detrimental effects of diffracted light from its aperture. By surrounding an open space with the open ends of slots, a space is defined that has virtually no physical edges. A slot of the slotted peep confines diffracted light within the slot. "(FIG. 1)" shows slotted peep,"(22)". What a user looking through the slotted peep would see is, "(20)". Light diffracted perpendicular to the edges of the slots darkens the slots. Since light is diffracted parallel to the preimeter of the sloted peep's aperture, diffraction will have no effect on the aperture. The slotted peep's aperture will virtually free of diffracted light. The slotted peep will not have the aforementioned shortcomings of current peeps. The slotted peep should be made in a rigid material. There is a need for a peep that is designed to eliminate the detrimental effects of diffracted light from its aperture.

5 Claims, 12 Drawing Sheets

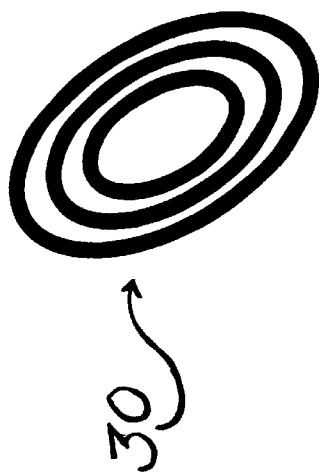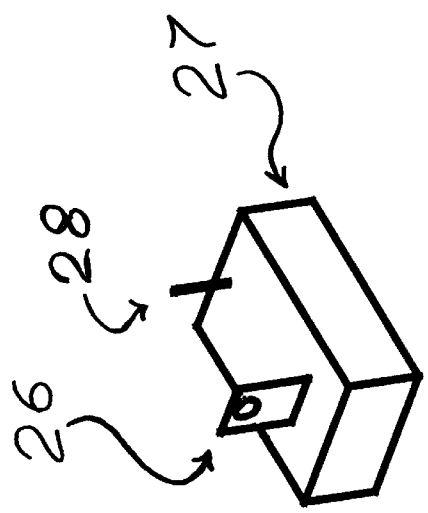
Fig. 2

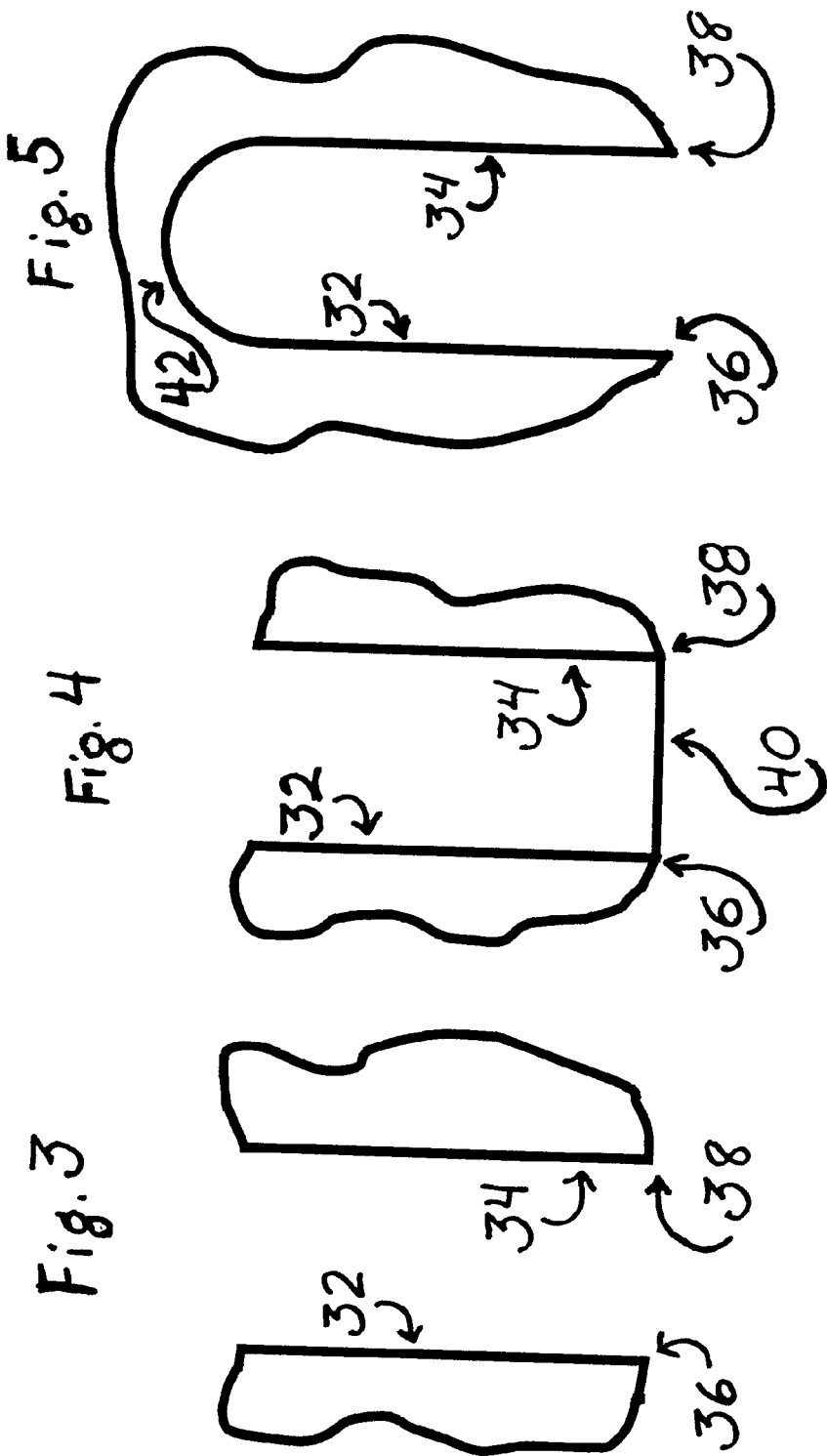

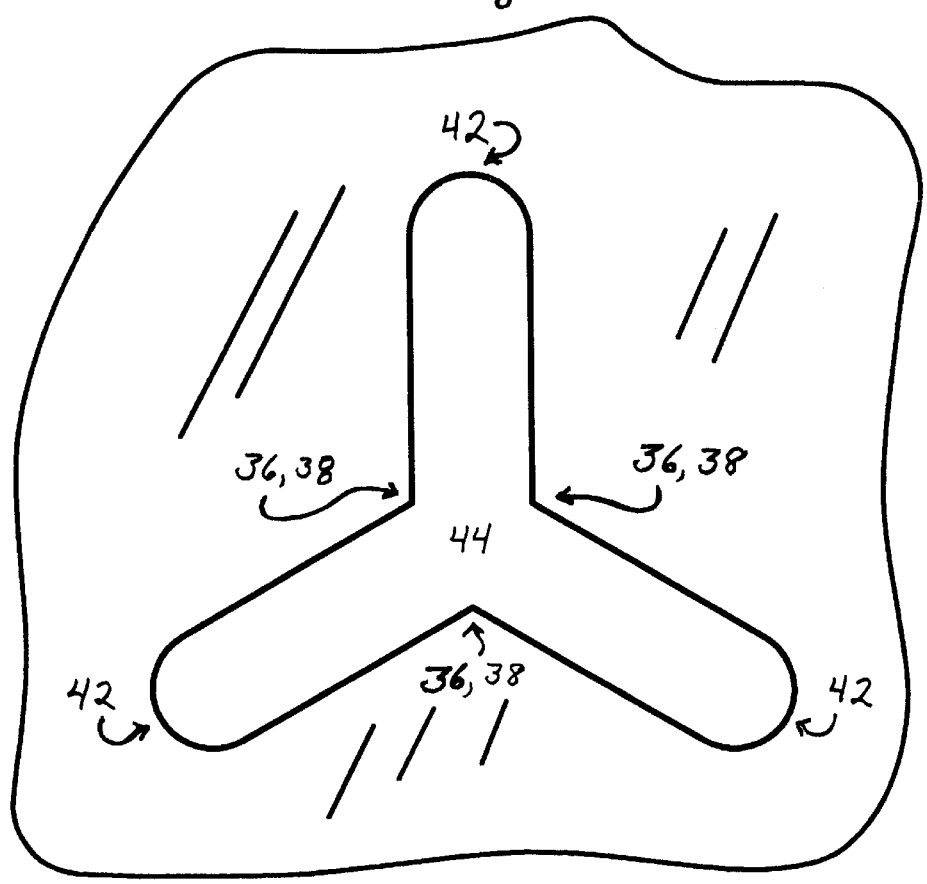

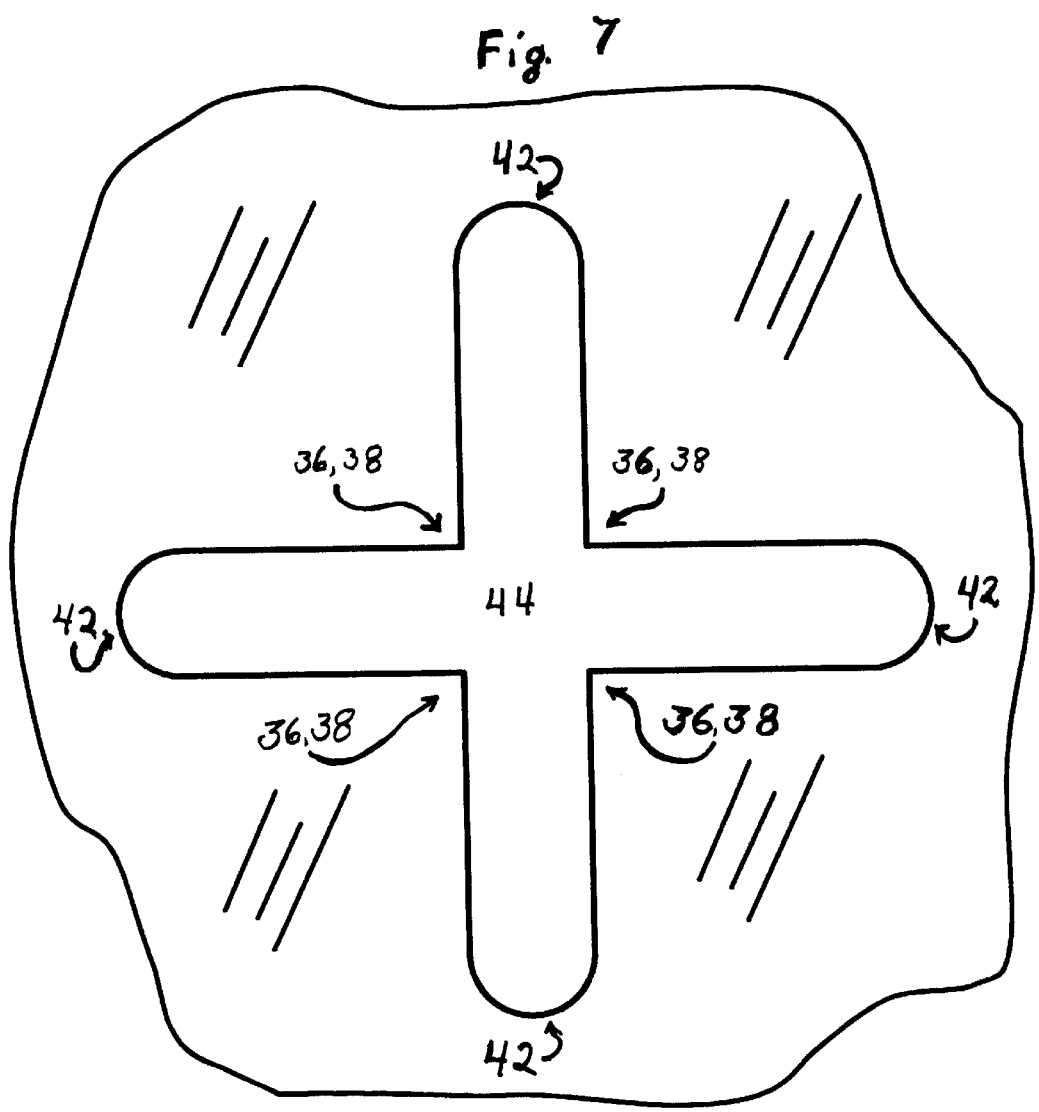

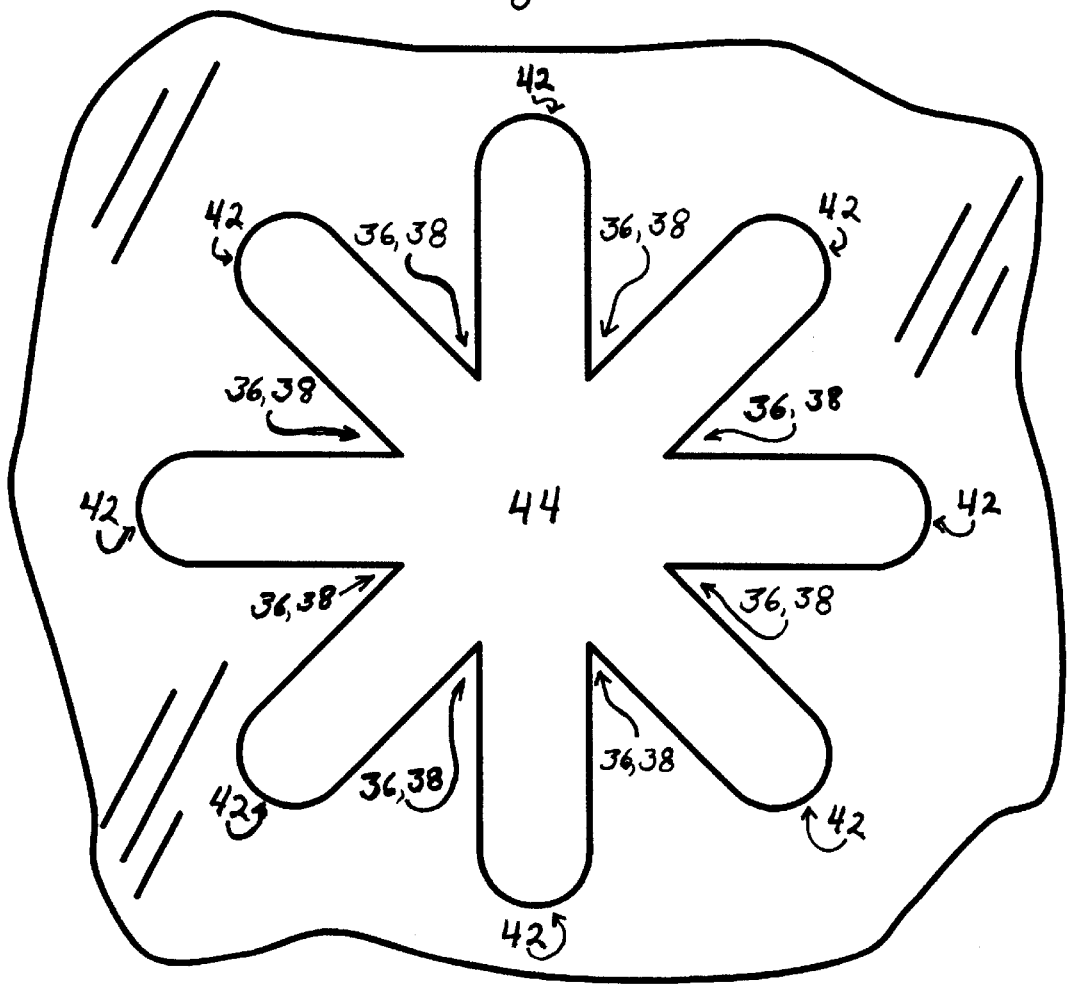

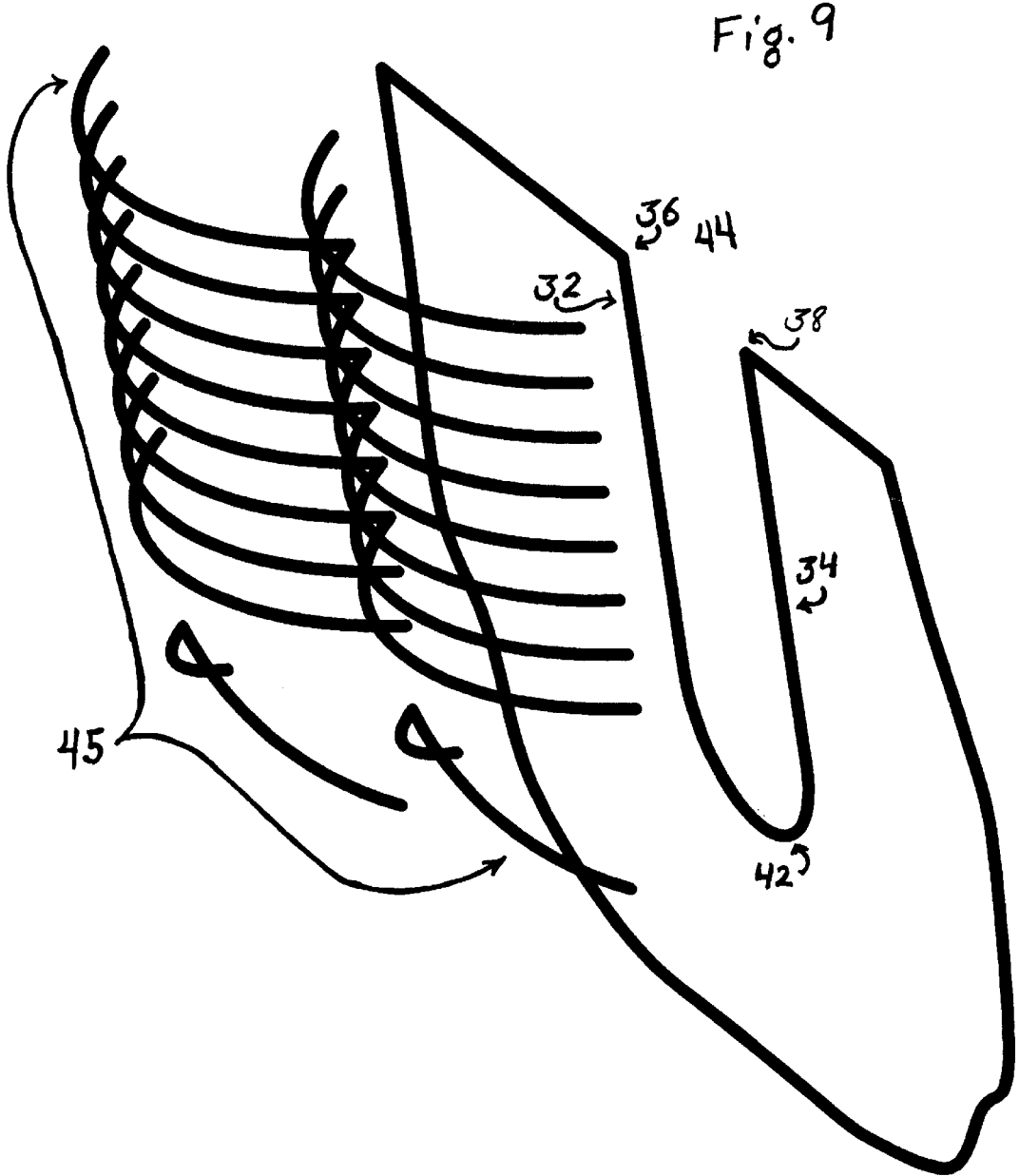

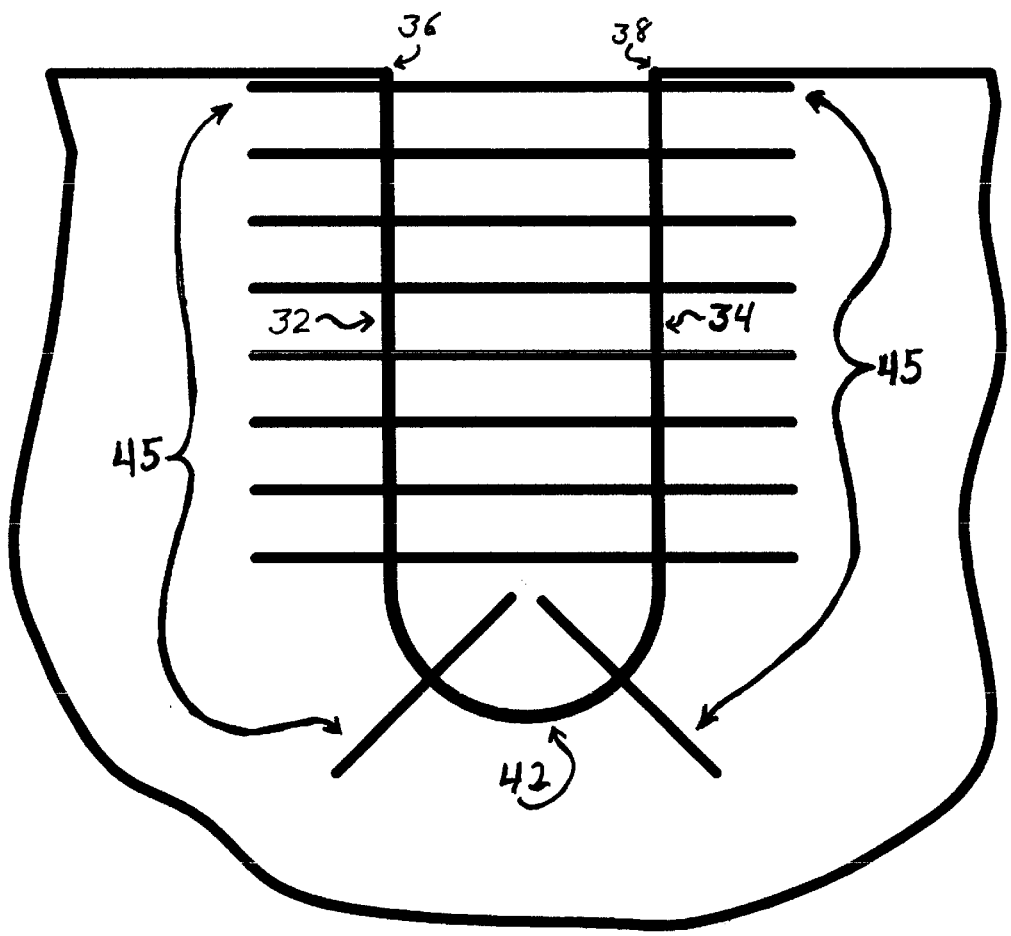

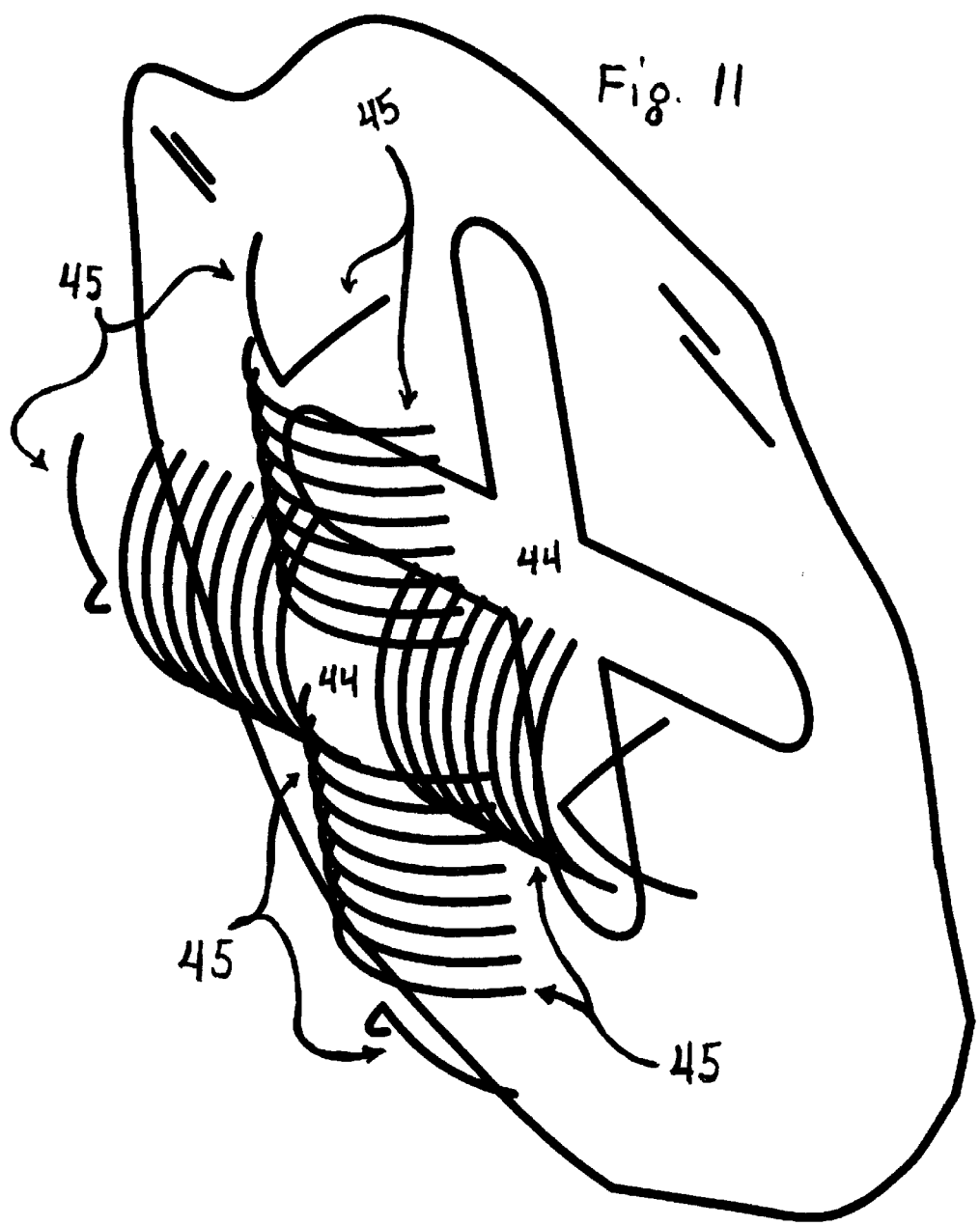

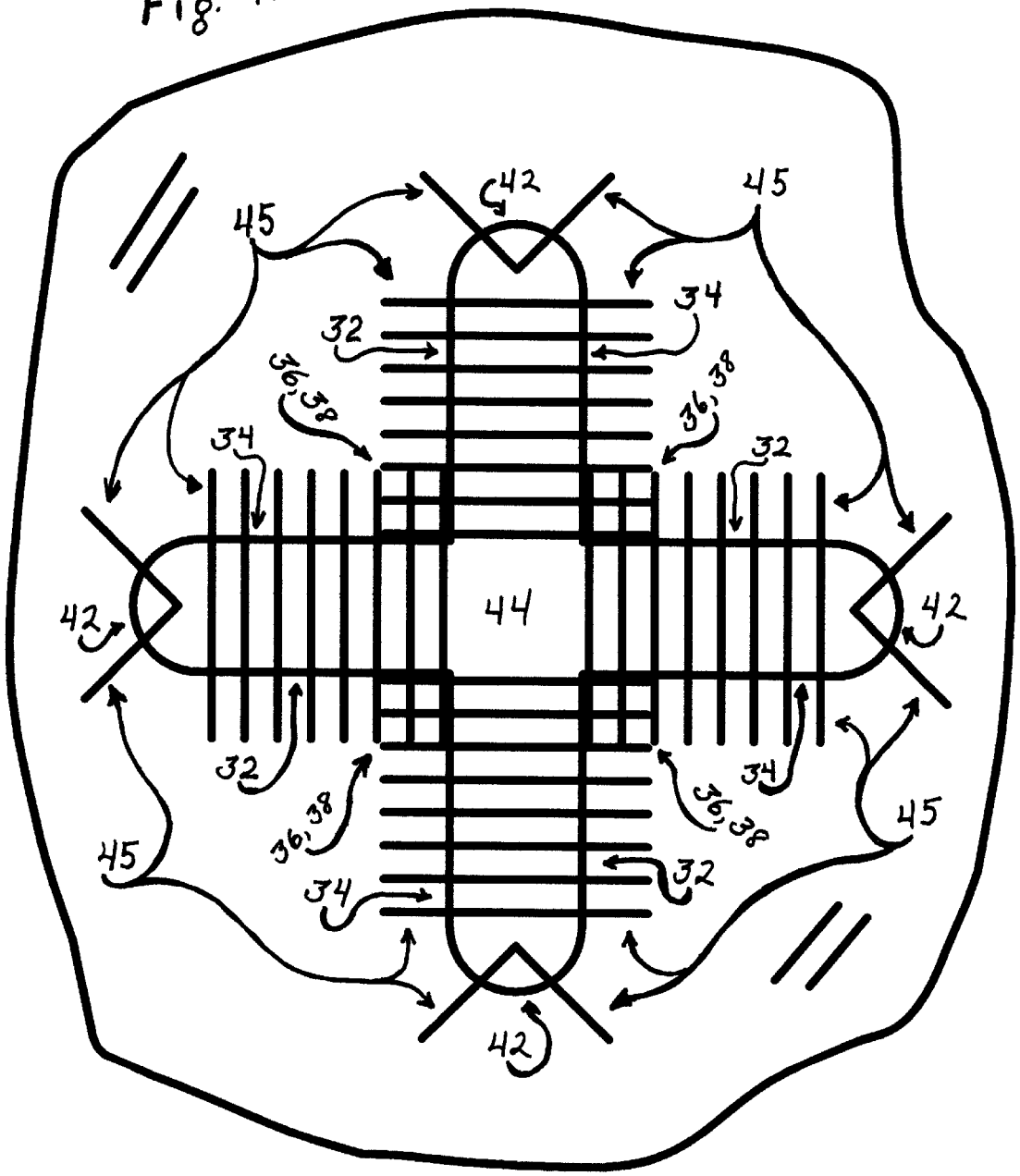

SLOTTED PEEP

The file of this patent contains at least one color drawing. Copies of the patent with color drawings will be provided by the PTO upon payment of necessary fee.

BACKGROUND

1. Field of Invention

This invention relates to devices used to align equipment with distant objects or targets.

2. Prior Art

Because of simplicity of design and traditional acceptance, peep sights have been used on all types of equipment that requires alignment with distant objects or targets.

A current peep sight is a rear-mounted device consisting of a thin plate made of rigid material with a round aperture near the center. FIG. 2 shows a peep sight 26 and a front sight 28 mounted on top of a piece of equipment 27. The front sight is a free standing pin. A person sighting the equipment, aligns the aperture of the peep sight with the front sight, and a target, 30. The person's ability to sight on the target accurately, is directly dependent on the alignment of the peep sight's aperture, the front sight, and the target. The distance between the target and the front sight is many times greater than the distance between the peep sight and the front sight. A small inaccuracy in the alignment of the two sights will cause a great inaccuracy in the alignment of the equipment with the target.

Current peep sights are a round apertured peep sight or its variations. Two variations of the round apertured peep are a cross hair peep, and an adjustable peep. The current peep sight fail to address the inadequacies caused by light diffracted within its aperture.

Diffraction of light describes a phenomenon. The phenomenon results in the bending of light toward an obstacle, as the light passes near the obstacle. Why diffraction occurs has not been totally proven, but its effects has been known for centuries. The figures below taken from *"Physics—Principles with Applications"*, Douglas C. Giancoli, author, illustrates the effects of Huygens' principle is consistent with diffraction (FIG. 14A) around the edge of an obstacle, (FIG. 14B) through a large hole and (FIG. 14C) through a small hole whose size is on the order of the wavlength of the wave.

FIG. 14A illustrates how light traveling left to right is diffracted by an obstacle. Diffraction alters the lights direction. Light passing near an obstacle bends toward the obstacle. Diffraction also reduces the intensity of the light by spreading it over a greater area. Because light is bent toward the edge, a person viewing the edge of the obstacle would not actually see the edge. The person would only see an image of the edge created by diffracted light. The viewer is seeing a false edge of the obstacle.

FIG. 14C illustrate the effect of light diffraction as light passes through a small aperture or hole. The aperture being small and the diffraction occuring perpendicular to its edges causes the aperture to appear closed.

FIG. 14B illustrates the effects of light diffraction as light passes through a large aperture or hole. Light passing near the edge of the aperture diffracts outward. Light reflecting off the edges of the aperture bends outward. A viewer never sees the aperture, only an image where diffracted and undiffracted light separate. The viewer sees a false aperture. The size and shape of the aperture the viewer sees is dependent on the light diffracted inside the aperture. When light intensity is inconsistent, the effect of light diffraction is inconsistent. Light passing through the aperture may be more intense to the right. The effect of the light diffraction would be less detectable to the right. The center of the aperture would appear more to the right. Since the viewer never sees the true aperture, the viewer will misalign the aperture and the equipment.

Light diffraction also reduces the intensity of the light passing through a currently designed peep aperture. When light is dim, a person may be able to see a target with out a peep, but be unable to see the target through the peep.

Oversizing a peep aperture is a current approach to avoiding the effects of diffracted light. FIG. 14B illustrates light passing through a large aperture. By oversizing the aperture, light near the center of the aperture will not be diffracted. Increasing the size of the aperture also increases the inaccuracy of the peep. A large aperture is more difficult to align with a front sight and a target then a small aperture. Also oversizing the peep aperture dose nothing to eliminate the affects of a false aperture.

A cross hair peep can eliminate the inaccuracy created by a false aperture. In doing so the cross hair peep creates additional light diffractions. The cross hair peep consists of a large peep aperture with two thin bars (hairs), one vertical and one horizontal. These bars intersect at the center of the aperture. The thin bars (hairs) provide the user with a consistent location for the center of the peep aperture. A user now aligns the intersection of the cross hairs with the front sight and the target. Compared to a other peeps, the cost of manufacturing the cross hair peep is many times greater. Making and installing the intersecting cross hairs is difficult. The fragileness of the hair like bars make the cross hair sight very susceptible to failure. Having edges, the hairs cause additional light diffractions. This additional diffraction occurs at the center of the cross hair peep. A critical area of any peep. The additional diffraction causes the cross hair peep to perform very poorly in low light.

An adjustable peep allows the user to increase the size of the peep's aperture when light is dim and decrease the size of the peep's aperture when light is bright. No attempt is made to eliminate light diffraction from the aperture. The adjustable peep has all the shortcomings of a traditional peep and is more difficult to manufacture.

Currently, light diffraction is being ignored by designers of peeps. The inadequacies caused by light diffraction, such as false aperture, oversized aperture, and poor performance under low light conditions are being ignored. There is a need for a peep sight that eliminates diffracted light from the peep sight's aperture. A peep sight designed to eliminate diffracted light from its aperture would be simple, and traditionally expectable, also more accurate and useful under all light conditions.

OBJECTS AND ADVANTAGES

Besides the objects and advantages described in the prior art, several objects and advantages of the current invention are:

A. to provide an aperture that is consistent in size and shape;

B. to provide a small aperture; and

C. to provide an aperture that performs well under all light conditions.

Still further objects and advantages will become apparent from a consideration of the ensuing description and drawings.

DRAWING FIGURES

FIG. 1 shows what a person looking through a slotted peep 22 at the tree 24 would see 26.

FIG. 2 shows a round peep sight 26, and a front sight 28 mounted on equipment 27 and a target 30.

FIG. 3 shows parallel sides 32, and 34 ending at point 36, and point 38.

FIG. 4 shows parallel sides 32, and 34 with line 40 perpendicular to side 32 and passes through end point 36, and end point 38.

FIG. 5 shows a slot used to construct a slotted peep.

FIG. 6 shows three slots arranged to form a slotted peep's aperture 44.

FIG. 7 shows four slots arranged to form a slotted peep's aperture 44.

FIG. 8 shows eight slots arranged to form a slotted peep's aperture 44.

FIG. 9 shows an isometric view of a lower slot of a slotted peep with red lines representing diffracted light.

FIG. 10 shows a front view of FIG. 9.

FIG. 11 shows an isometric view of a slotted peep with red lines representing diffracted light.

FIG. 12 shows a front view of the slotted peep shown in FIG. 11.

FIG. 13 shows a close-up cut-away view of a portion of a device constructed according to the present invention, wherein edge 46 forms a portion of a slot and wherein FIG. 13 illustrates the difference in thickness between the side, at the edge forming one of the slots, and the rest of the device.

Figure 14:
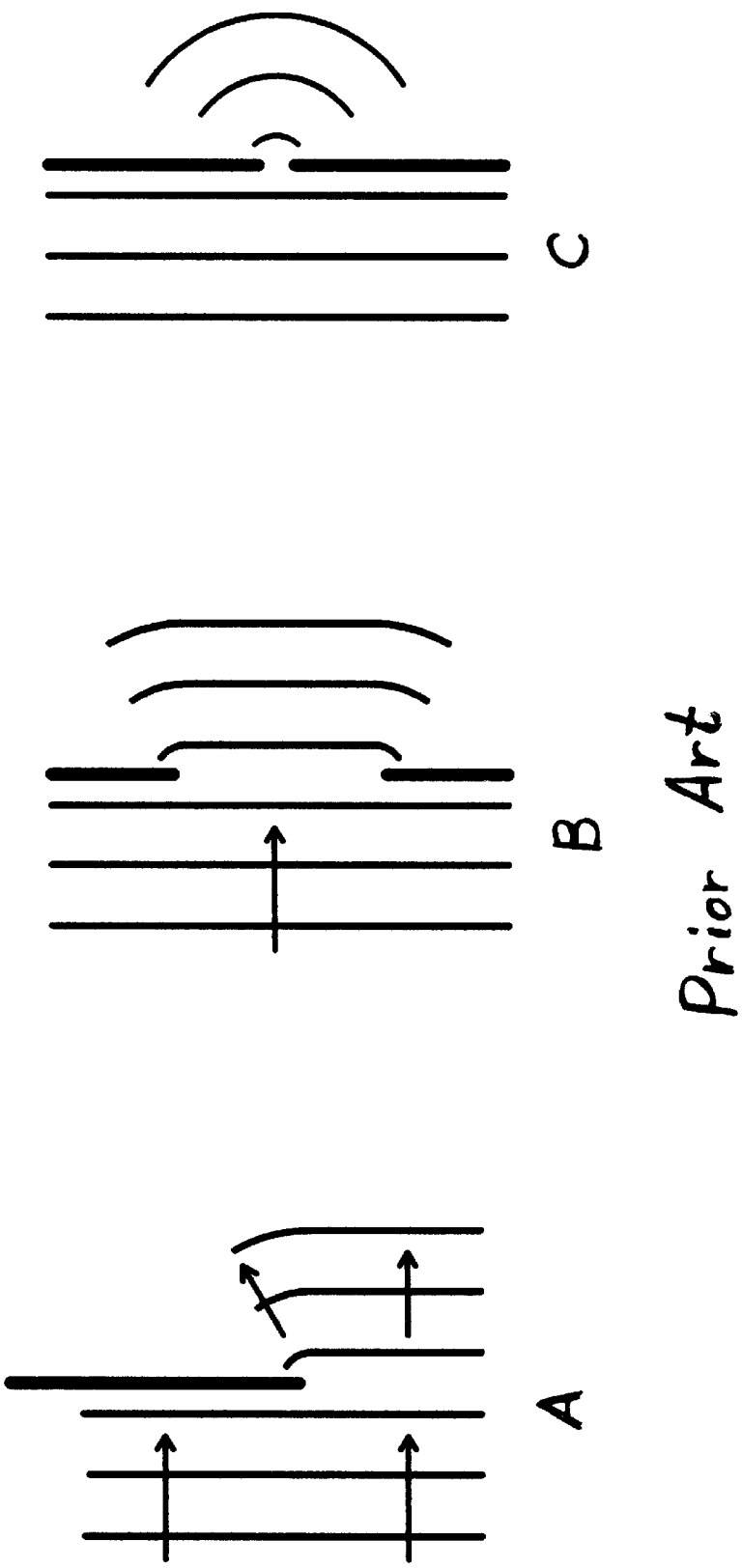

FIGS. 14 A, B and C illustrate the well known principles of light diffraction.

REFERENCE NUMERALS IN DRAWINGS

| | |
|---|---|
| 20 a tree as seen by user | 22 slotted peep |
| 24 tree | 26 peep sight with a round aperture |
| 27 equipment | 28 front sight |
| 30 target | 32 first side of slot |
| 34 second side of slot | 36 end point of side 32 |
| 38 end point of side 34 | 40 straight line |
| 42 closed end of slot | 44 slotted peep aperture |
| 46 edge of sides 32, 34, and 42 | |

DESCRIPTION

Figure 1:
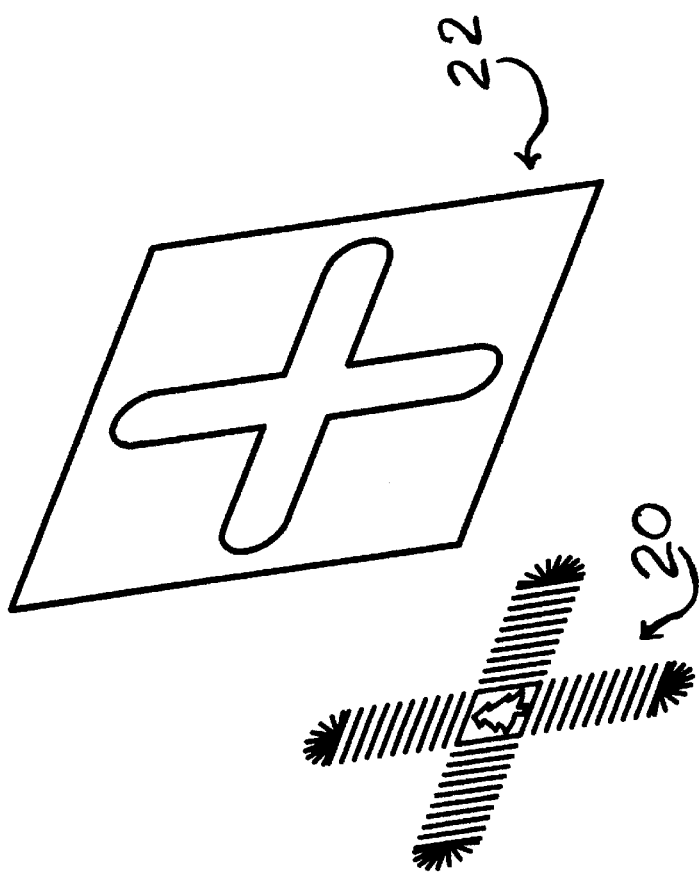

FIG. 1 Shows a slotted peep made up of four slots 22. Each slot has an open end. A user looking through an aperture of the slotted peep toward a tree 24 would see 20. The diffracted light darkens the slots. The user will see an open space with four sides and the tree visible within it. The tree appears with the similar clarity when seen through the aperture as when not seen through the aperture.

FIG. 2 show a current peep sight and a front sight mounted on equipment. The peep sight 26 has a round aperture. The distance between front sight 28, and target 30 is much greater then the distance between sight 26, and 28. In the field the ratio of these distances could be much greater. A small error in the alignment of peep sight 26, and front sight 28 can cause a large error in the alignment of equipment 27, and target 30.

FIG. 3 shows a slot consists of two parallel sides 32, and 34, equal in length and having end points 36, and 38.

FIG. 4 shows a straight line 40 drawn perpendicular to side 32 and passing through end point 36. Line 40 will pass through end point 38. Line 40 is perpendicular to line 34.

FIG. 5 shows side 42 as curved and forming the closed end of a slot of a slotted peep. The slot has three sides and an open end.

FIGS. 6, 7, and 8 shows different forms of slotted peeps. A slotted peep consists of three or more slots simular to FIG. 5. The slots are arranged with point 36 of one slot coinciding with point 38 of the adjacent slot. Curved side 42 is the outermost side. The perimeter a slotted peep aperture is defined by the open ends of the slots. Each aperture is indicated by 44. The only physical objects near the perimeter of the aperture are points 36, and 38. These points have little or no edge. A slotted peep aperture has virtually no edges defining it.

FIG. 9 shows an isometric view illustrating light as it passes through a slot of a slotted peep. The light, passing right to left, is diffracted by the edges of the slot. The diffracted light, bends perpendicular to the sides of the slot and parallel to the opening between points 36 and 38. Light is not diffracted in a open space above and between points 36, and 38. The space 44 above and between points 36 and 38 has no physical edge to cause the light to diffract. Light diffraction is confined to the slot. A slotted peep aperture 44 will be virtually free of diffracted light.

FIG. 10 shows a front view of the slot shown in FIG. 9. FIG. 10 illustrates how a slot is able to confine the light diffraction within the slot. The diffracted light is diffracted perpendicular to the edges of sides 32, and 34. Sides 32, and 34 are perpendicular to the opening between points 36, and 38. The light is diffracted parallel to the opening between points 36, and 38. Sides 32, and 34 will not cause light to diffract above points 36, and 38. No light is diffracted vertically because the slot is open between points 36, and 38. There is no edge at the top of the slot between points 36, and 38 to cause light diffraction. The length of the slot prevents any light diffracted by the bottom edge 42 from affecting the space above points 36, and 38.

FIG. 11 shows an isometric view of four slots. The slots are arranged to form a slotted peep. The red lines depict diffracted light being bent perpendicular to the sides of the slots. The aperture of the slotted peep is indicated by 44.

FIG. 12 shows the front view of a slotted peep as illustrated in FIG. 11. Each slot functions as described in FIG. 10. The diffracted light, red lines, bending perpendicular to the sides of the slots and parallel to the perimeter of the slotted peep's aperture 44. Light diffraction is confined within the slots. An aperture 44 of the slotted peep is an open space with its perimeter defined by the open ends of the slots. The aperture has no physical edges to diffract light. The aperture will be free of shortcomings caused by diffracted light.

Figure 13:
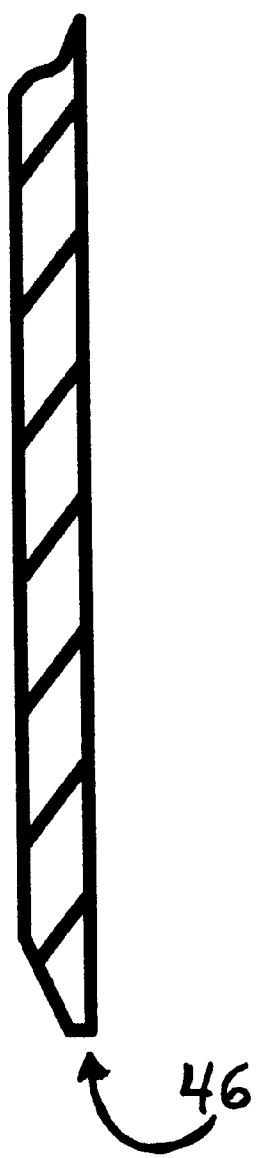

FIG. 13 is a cross section view of the edge of sides 32, 34, and 42. Line 46 represents the width of the edge of sides 32, 34, and 42. Edge 46 should be as short as possible. Edge 46 being short reduces the amount of edge at points 36, and 38. The length of the slot should be long enough to enable the light diffracted by the closed end of the slot 42 to be diverted outside of the area of the central aperture 44. As shown in FIG. 10, when using a curved side 42, the slot length of approximately twice the width of the slot or longer is preferred. The shortness of edge 46 also aids in the control and confinement of the light diffracted by sides 32, 34, and 42.

A slotted peep will meet all the aforementioned objects and advantages. A slotted peep's aperture will be free of shortcomings caused by diffracted light. There are no edges in or around the aperture to cause light to diffract. As light intensity changes causing the effects of light diffraction to change, the size and shape of the slotted peep aperture will be unaffected. The diffraction, directed parallel to the perimeter of the aperture can not affect the aperture. The slotted peep's aperture can be made smaller. The slotted peep's aperture need not be oversized. Diffracted light is confined within the slotted peep's slots. The amount of light diffraction that can occur within the slotted peep's aperture is insignifcant and therefore it need not be compensated for. The slotted peep will perform well under all light conditions. The light passing through the slotted peep's aperture is not diffracted away from the user's eye. The user will see just as well thru the slotted peep as not thru the peep.

A slotted peep can be altered from the above discription and still perform adequately. Side 42 need not be curved as long as its edge does not diffract light away from of the slotted peep's aperture. Sides 32, and 34 need not be straight or parallel as long as the edges of sides 32, and 34 do not diffract light away from the slotted peep's aperture. A slot can be any shape as long as it confines the light diffraction within itself and provides the open end needed to define the perimeter of the slotted peep's aperture.

A critical location of a slotted peep is where end points 36 and end points 38 coincide. This location provides the greatest opportunity for light to be diffracted away from the slotted peep's aperture. There may be an insignificant amount of light diffraction in the slotted peep's aperture. This most likely would be caused by the locations where points 36 and 38 coincide. I recommend the locations where points 36 and 38 coincide be sharp corners.

The width and number of the slots of a slotted peep can vary depending on the size of an aperture desired. The wider the slots and the greater the number of slots, the larger the aperture. I recommend a slot width of aproximently 1 mm. and an aperture size of at least aproximently 1 mm. square. For ease of manufacturing, I recommend using four slots in a rectanguler pattern. Three slots are not recommended.

I recommend a length for sides 32, and 34 of aproximently 2 mm. This length has tested out adequate to prevent side 42 from diffracting light from a slotted peep aperture.

A slotted peep should be housed in a rigid material. I recommend the housing for the slotted peep have a non-reflective surface.

While my above description contains many specifics these should not be construed as limitations on the scope of the invention, but rather as a simplification of one preferred embodiment thereof Many other variations are possible. Accordingly, the scope of the invention should be determined not by the embodiments illustrated, but by the appended claims and their legal equivalents.

SUMMARY

The reader will see that a slotted peep of this invention is more accurate and useful than current peeps. The slotted peep confines light diffraction within the slots of the slotted peep. The slotted peep's aperture is made up of open space and surrounded by the open ends of the slots. Therefore the slotted peep's aperture has virtually on edges to diffract light. The slotted peep's aperture will be consistant in size and shape. The slotted peep's aperture can be made smaller. The slotted peep's aperture it will be virtually free of diffracted light and need not be oversized. The slotted peep will function well under all light conditions. The slotted peep will provide greater accuracy and utility then current peeps.

What is claimed is:

1. A slotted peep for use in viewing an object, comprising:

A member having at least four slots formed therein;

each of said slots having a pair of generally parallel sides extending a length between an open end and a closed end;

each of said slots intersecting angularly spaced adjacent ones of said slots at said open ends thereof such that the open ends intersect to form corners and said intersection defines a central aperature;

the closed ends of said slots being curved; and, the slots having the width thereof selected such that diffraction of light is confined to said slots and said central aperture is substrantially free from light diffraction.

2. The slotted peep of claim 1, wherein:

each of said sides includes an edge and wherein the edges of said generally parallel sides and said closed end define a border of said slots; said member having a thickness adjacent to said border which is less than a thickness of said member away from said border.

3. The slotted peep of claim 2, wherein:

said border defines a knife edge.

4. The slotted peep of claim 1, wherein:

said slots are generally equi-angularly spaced.

5. The slotted peep of claim 1, wherein:

the slots having the length being at least twice the width thereof.

* * * * *